United States Patent
Nio et al.

(10) Patent No.: US 6,795,588 B1
(45) Date of Patent: Sep. 21, 2004

(54) NOISE DETECTOR, NOISE DETECTION METHOD, SIGNAL PROCESSOR AND SIGNAL PROCESSING METHOD

(75) Inventors: Yutaka Nio, Osaka (JP); Katsumi Terai, Ibaraki (JP); Naoji Okumura, Minoo (JP); Kazuto Tanaka, Otsu (JP)

(73) Assignee: Matsushita Electrical Industrial Co., Ltd., Kadoma (JP)

( * ) Notice: Subject to any disclaimer, the term of this patent is extended or adjusted under 35 U.S.C. 154(b) by 569 days.

(21) Appl. No.: 09/628,678

(22) Filed: Jul. 28, 2000

(30) Foreign Application Priority Data

Jul. 29, 1999 (JP) .......................................... 11-215000

(51) Int. Cl.⁷ ................................................. G06K 9/40
(52) U.S. Cl. ...................... 382/261; 382/266; 348/470; 348/533; 348/610; 348/627; 375/240.29
(58) Field of Search ............................... 382/260, 261, 382/262, 263, 264, 265, 266, 269, 195, 199, 267, 268; 348/606, 607, 610, 618, 683, 533, 470, 625, 626, 627; 375/240.25, 240.29

(56) References Cited

U.S. PATENT DOCUMENTS

| | | |
|---|---|---|
| 5,241,387 A | 8/1993 | Fujikawa et al. |
| 5,572,603 A | 11/1996 | Koike |
| 5,610,729 A | 3/1997 | Nakajima .................... 358/463 |
| 5,754,699 A * | 5/1998 | Sugahara ..................... 382/233 |
| 5,819,035 A | 10/1998 | Devaney et al. ........ 395/200.32 |
| 5,844,614 A * | 12/1998 | Chong et al. ........... 375/240.24 |
| 5,848,181 A * | 12/1998 | Ogata .......................... 382/169 |
| 6,088,065 A * | 7/2000 | Uchida ........................ 348/625 |
| 6,148,115 A * | 11/2000 | Mackinnon et al. ......... 382/266 |
| 6,195,132 B1 * | 2/2001 | Kimura et al. ............... 348/618 |
| 6,587,509 B1 * | 7/2003 | Suzuki et al. ........... 375/240.29 |

FOREIGN PATENT DOCUMENTS

| | | |
|---|---|---|
| EP | 0 529 903 A2 | 3/1993 |
| EP | 0 529 903 A3 | 3/1993 |
| JP | 7-307942 | 11/1995 |
| WO | WO96/42165 | 12/1996 |

OTHER PUBLICATIONS

Australian Patent Office Search Report dated Feb. 1, 2002.
Hiroyuki Okada et al.: "An Adaptive Image Quality Improvement Method For DCT Coding Schemes" Proceedings of the Picture Coding Symposium (PCS). Lausanne, Mar. 17–19, 1993, Lausanne, SFIT, CH, Mar. 17, 1993, pp. 1320-A–1320-B, XP000346472 Section 2: "Distortion Reduction Method by Post–Filtering"; figure 1.
Hu J. et al.: "Removal of Blocking and Ringing Artifacts in Transform Coded Images" Acoustics, Speech, and Signal Processing, 1997. ICASSP–97., 1997 IEEE International Conference on Munich, Germany Apr. 21–24, 1997, Los Alamitos, CA, USA, IEEE Comput. Soc. US, Apr. 21, 1997, pp. 2565–2568, XP010225679 ISBN: 0–8186–7919–0 Section 2.3: "Removal of Ringing Artifact".
Patent Abstracts of Japan vol. 014, No. 222 May 10, 1990 & JP 02 056179 Nippon Telegr & Teleph Corp), Feb. 26, 1990.
Patent Abstracts of Japan 10–191326 Jul. 21, 1998 Sony Corp, Jul. 11, 1997.
A copy of European Search Report on EP 00 30 6457 dated Aug. 20, 2003.

* cited by examiner

Primary Examiner—Samir Ahmed
Assistant Examiner—Anand Bhatnagar
(74) Attorney, Agent, or Firm—Westerman, Hattori, Daniels & Adrian, LLP

(57) ABSTRACT

A ringing detector detects mosquito noise and ringing for outputting an image signal smoothed by a horizontal/vertical high-pass filter when mosquito noise and ringing are detected while outputting the image signal as such when neither mosquito noise nor ringing is detected, thereby properly correcting the image signal without reducing the texture specific to the image signal also in a portion continuously exhibiting fine details.

14 Claims, 5 Drawing Sheets

NOISE DETECTOR, NOISE DETECTION METHOD, SIGNAL PROCESSOR AND SIGNAL PROCESSING METHOD

BACKGROUND OF THE INVENTION

1. Field of the Invention

The present invention relates to a noise detector and a noise detection method for detecting noise of an image signal as well as a signal processor and a signal processing method employing the noise detector and the noise detection method.

2. Description of the Prior Art

For example, Japanese Patent Laying-Open No. 7-307942 discloses a conventional signal processor eliminating noise from an image signal. FIG. 5 is a block diagram showing the structure of the conventional signal processor.

The signal processor shown in FIG. 5 comprises a vertical adaptive filter 8 and a horizontal adaptive filter 9. The vertical adaptive filter 8 includes a vertical logical filter 41, a vertical unevenness determination part 42 and a selector 43. The horizontal adaptive filter 9 includes a horizontal logical filter 44, a horizontal unevenness determination part 45 and a selector 46.

When an image signal is input, the vertical unevenness determination part 42 determines the magnitude of vertical unevenness around each pixel and outputs the result of the determination to the selector 43. When the vertical unevenness determination part 42 determines that the vertical unevenness around the pixel to be processed is large, the selector 43 outputs a signal of the pixel to the horizontal adaptive filter 9 as such. When the vertical unevenness determination part 42 determines that the vertical unevenness is small, the selector 43 outputs the image signal from which vertical noise is eliminated by the vertical logical filter 41 to the horizontal adaptive filter 9.

Then, the horizontal unevenness determination part 45 determines the magnitude of horizontal unevenness around each pixel and outputs the result of the determination to the selector 46. When the horizontal unevenness determination part 45 determines that the horizontal unevenness around the pixel to be processed is large, the selector 46 outputs the image signal output from the vertical adaptive filter 8 as such. When the horizontal unevenness determination part 45 determines that the horizontal unevenness is small, the selector 46 outputs the image signal from which horizontal noise is eliminated by the horizontal logical filter 44.

Through the aforementioned operations, the signal processor shown in FIG. 5 can eliminate noise from segments or edges included in the image signal without deteriorating the resolution, i.e., without blurring the segments or edges.

While the aforementioned conventional signal processor can reproduce large-amplitude edges without blurring the same, however, the vertical and horizontal logical filters 41 and 44 disadvantageously blur portions continuously exhibiting fine details, such as the surfaces of clothes, the skin of a human being and a wood, for example, specific to the image signal and reduce the texture thereof.

SUMMARY OF THE INVENTION

An object of the present invention is to provide a signal processor and a signal processing method capable of properly correcting an image signal without reducing the texture specific to the image signal also in a portion continuously exhibiting fine details.

Another object of the present invention is to provide a noise detector and a noise detection method, employed for the aforementioned signal processor and signal processing method, capable of detecting mosquito noise and ringing of an image signal.

A noise detector according to an aspect of the present invention comprises a high-frequency component extraction circuit extracting a high-frequency component of an input image signal, a level detection circuit detecting the level of the high-frequency component extracted by the high-frequency component extraction circuit and outputting the result of detection as a level signal and a noise detection circuit detecting a small-amplitude edge around a large-amplitude edge of the image signal as noise on the basis of the level signal detected by the level detection circuit.

The noise detector extracts the high-frequency component of the image signal and detects the level thereof, whereby the small-amplitude edge around the large-amplitude edge of the image signal can be detected on the basis of the detected level and this portion can be detected as noise. Consequently, mosquito noise and ringing caused around the large-amplitude edge of the image signal can be detected.

The noise detection circuit may include an extension circuit outputting an extended signal obtained by extending the peak of the level signal detected by the level detection circuit, a conversion circuit outputting a 1/n signal obtained by converting the level of the extended signal output from the extension circuit to 1/n times and a small-amplitude detection circuit comparing the 1/n signal output from the conversion circuit with the level signal output from the level detection circuit for detecting the small-amplitude edge around the large-amplitude edge of the image signal.

In this case, the small-amplitude edge, existing around the large-amplitude edge corresponding to the peak of the level signal, smaller than 1/n of the level of the large-amplitude edge can be detected by comparing the 1/n signal obtained by extending the peak of the level signal and compressing the same to 1/n times with the level signal, and the small-amplitude edge can be detected as mosquito noise and ringing.

The noise detection circuit may further include a large-amplitude detection circuit comparing the extended signal output from the extension circuit with a prescribed reference value for detecting a large-amplitude edge having a greater level than the reference value, for detecting the small-amplitude edge detected by the small-amplitude detection circuit as noise with respect to the large-amplitude edge detected by the large-amplitude detection circuit.

In this case, the large-amplitude edge, which is a signal specific to the image signal having a greater level than the reference value can be detected by comparing the extended signal obtained by extending the peak of the level signal corresponding to the large-amplitude edge with the prescribed reference value. Therefore, a small-amplitude edge around the large-amplitude edge, which is a signal specific to the image signal, can be detected as noise, and mosquito noise and ringing can be more correctly detected.

The small-amplitude detection circuit may output a first detection result signal indicating that the 1/n signal output from the conversion circuit is greater than the level signal output from the level detection circuit, the large-amplitude detection circuit may output a second detection result signal indicating that the extended signal output from the extension circuit is greater than the reference value, and the noise detection circuit may further include a logic circuit ANDing the first detection result signal output from the small-amplitude detection circuit and the second detection result signal output from the large-amplitude detection circuit.

In this case, the first detection result signal indicates a portion where the 1/n signal is greater than the level signal, i.e., a portion excluding a large-amplitude edge portion while the second detection result signal indicates a portion where the extended signal is greater than the reference value, i.e., a small-amplitude edge portion around the large-amplitude edge including the large-amplitude edge portion. Therefore, only the small-amplitude edge around the large-amplitude edge can be detected by ANDing the outputs. Consequently, only mosquito noise and ringing can be detected from the portion around the large-amplitude edge of the image signal with a simple structure employing a binary signal.

The high-frequency component extraction circuit may include a horizontal extraction circuit extracting a horizontal high-frequency component of the input image signal, a vertical extraction circuit extracting a vertical high-frequency component of the input image signal and an adder circuit adding the horizontal high-frequency component extracted by the horizontal extraction circuit and the vertical high-frequency component extracted by the vertical extraction circuit to each other, the level detection circuit may detect the level of the sum of the high-frequency components by the adder circuit and outputting the result of detection as the level signal, and the noise detection circuit may detect horizontal and vertical small-amplitude edges around horizontal and vertical large-amplitude edges of the image signal on the basis of the level signal detected by the level detection circuit.

In this case, the horizontal and vertical high-frequency components are extracted and added to each other, and the level of the sum of the high-frequency components is thereafter detected so that the horizontal and vertical small-amplitude edges around the horizontal and vertical large-amplitude edges of the image signal can be detected as noise on the basis of the level signal. Therefore, horizontal and vertical mosquito noise and ringing caused around the horizontal and vertical large-amplitude edges of the image signal can be detected. The extracted horizontal and vertical high-frequency components are added to each other for performing subsequent horizontal and vertical processing in common, whereby the structure following addition is so simplified that the horizontal and vertical mosquito noise and ringing can be detected with a simple structure.

A signal processor according to another aspect of the present invention comprises a detection circuit detecting horizontal and/or vertical small-amplitude edge(s) around horizontal and/or vertical large-amplitude edge(s) of an input image signal as noise and a processing circuit performing horizontal and/or vertical correction of the image signal in response to the result of detection in the detection circuit.

The signal processor detects the horizontal and/or vertical small amplitude edge(s) around the horizontal and/or vertical large-amplitude edge(s) of the image signal as noise thereby detecting mosquito noise and ringing of the image signal and performing horizontal and/or vertical correction of the input image signal in response to the result of detection. Therefore, the image signal can be properly corrected in response to the states of mosquito noise and ringing. Consequently, the image signal can be properly corrected without reducing the texture specific to the image signal also in a portion continuously exhibiting fine details.

The processing circuit may include a smoothing circuit performing horizontal and/or vertical smoothing of the image signal in response to noise detected by the detection circuit.

In this case, the image signal is subjected to horizontal and/or vertical smoothing in response to the detected noise, i.e., mosquito noise and ringing, whereby proper smoothing can be performed in response to the states of the mosquito noise and the ringing.

The smoothing circuit preferably performs horizontal and/or vertical smoothing of the image signal when the detection circuit detects noise.

In this case, the image signal is subjected to horizontal and/or vertical smoothing when noise, i.e., mosquito noise and ringing take place, whereby only mosquito noise and ringing can be smoothed for implementing an image having neither mosquito noise nor ringing.

The processing circuit may include a contour correction circuit performing horizontal and/or vertical contour correction of the image signal in response to noise detected by the detection circuit.

In this case, the image signal is subjected to horizontal and/or vertical contour correction in response to the detected noise, i.e., mosquito noise and ringing, whereby proper contour correction can be performed in response to the states of the mosquito noise and the ringing.

The contour correction circuit preferably performs the horizontal and/or vertical contour correction of the image signal when the detection circuit detects no noise.

In this case, the image signal is subjected to horizontal and/or vertical contour correction when no noise, i.e., neither mosquito noise nor ringing takes place, whereby a high-quality image enhanced in an edge portion specific to the image signal can be implemented without enhancing mosquito noise and ringing.

The detection circuit may include a high-frequency component extraction circuit extracting a high-frequency component of the input image signal, a level detection circuit detecting the level of the high-frequency component extracted by the high-frequency component extraction circuit and outputting the result of detection as a level signal and a noise detection circuit detecting the small-amplitude edge around the large-amplitude edge of the image signal on the basis of the level signal detected by the level detection circuit.

In this case, the high-frequency component of the image signal is extracted for detecting the level thereof, whereby the small-amplitude edge around the large-amplitude edge of the image signal can be detected on the basis of the detected level and this portion can be detected as noise. Therefore, mosquito noise and ringing caused around the large-amplitude edge of the image signal can be detected.

The noise detection circuit may include an extension circuit outputting an extended signal obtained by extending the peak of the level signal detected by the level detection circuit, a conversion circuit outputting a 1/n signal obtained by converting the level of the extended signal output from the extension circuit to 1/n times and a small-amplitude detection circuit comparing the 1/n signal output from the conversion circuit with the level signal output from the level detection circuit for detecting the small-amplitude edge around the large-amplitude edge of the image signal.

In this case, the small-amplitude edge, existing around the large-amplitude edge corresponding to the peak of the level signal, smaller than 1/n of the level of the large-amplitude edge can be detected by comparing the 1/n signal obtained by extending the peak of the level signal and compressing the same to 1/n times with the level signal, and this small-amplitude edge can be detected as mosquito noise and ringing.

The noise detection circuit may further include a large-amplitude detection circuit comparing the extended signal output from the extension circuit with a prescribed reference value for detecting a large-amplitude edge having a greater level than the reference value, for detecting the small-amplitude edge detected by the small-amplitude detection circuit as noise with respect to the large-amplitude edge detected by the large-amplitude detection circuit.

In this case, the large-amplitude edge, which is a signal specific to the image signal having a greater level than the reference value, can be detected by comparing the extended signal obtained by extending the peak of the level signal corresponding to the large-amplitude edge with the prescribed reference value. Therefore, a small-amplitude edge around the large-amplitude edge, which is a signal specific to the image signal, can be detected as noise, and mosquito noise and ringing can be more correctly detected.

The small-amplitude detection circuit may output a first detection result signal indicating that the 1/n signal output from the conversion circuit is greater than the level signal output from the level detection circuit, the large-amplitude detection circuit may output a second detection result signal indicating that the extended signal output from the extension circuit is greater than the reference value, and the noise detection circuit may further include a logic circuit ANDing the first detection result signal output from the small-amplitude detection circuit and the second detection result signal output from the large-amplitude detection circuit.

In this case, the first detection result signal indicates a portion where the 1/n signal is greater than the level signal, i.e., a portion excluding a large-amplitude edge portion while the second detection result signal indicates a portion where the extended signal is greater than the reference value, i.e., a small-amplitude edge portion around the large-amplitude edge including the large-amplitude edge portion. Therefore, only the small-amplitude edge around the large-amplitude edge can be detected by ANDing the outputs. Consequently, only mosquito noise and ringing can be detected from the portion around the large-amplitude edge of the image signal with a simple structure employing a binary signal.

The high-frequency component extraction circuit may include a horizontal extraction circuit extracting a horizontal high-frequency component of the input image signal, a vertical extraction circuit extracting a vertical high-frequency component of the input image signal and an adder circuit adding the horizontal high-frequency component extracted by the horizontal extraction circuit and the vertical high-frequency component extracted by the vertical extraction circuit to each other, the level detection circuit may detect the level of the sum of the high-frequency components obtained by the adder circuit and outputting the result of detection as the level signal, and the noise detection circuit may detect horizontal and vertical small-amplitude edges around horizontal and vertical large-amplitude edges of the image signal on the basis of the level signal detected by the level detection circuit.

In this case, the horizontal and vertical high-frequency components are extracted and added to each other, and the level of the sum of the high-frequency components is thereafter detected so that the horizontal and vertical small-amplitude edges around the horizontal and vertical large-amplitude edges of the image signal can be detected as noise on the basis of the level signal. Therefore, horizontal and vertical mosquito noise and ringing caused around the horizontal and vertical large-amplitude edges of the image signal can be detected. The extracted horizontal and vertical high-frequency components are added to each other for performing subsequent horizontal and vertical processing in common, whereby the structure following addition is so simplified that the horizontal and vertical mosquito noise and ringing can be detected with a simple structure.

A noise detection method according to still another aspect of the present invention comprises steps of extracting a high-frequency component of an input image signal, detecting the level of the extracted high-frequency component and outputting the result of detection as a level signal, and detecting a small-amplitude edge around a large-amplitude edge of the image signal as noise on the basis of the level signal.

The high-frequency component of the image signal is extracted for detecting the level thereof in the noise detection method, whereby the small-amplitude edge around the large-amplitude edge of the image signal can be detected on the basis of the detected level and this portion can be detected as noise. Consequently, mosquito noise and ringing caused around the large-amplitude edge of the image signal can be detected.

The noise detection step may include steps of outputting an extended signal obtained by extending the peak of the level signal, outputting a 1/n signal obtained by converting the level of the extended signal to 1/n times, and comparing the 1/n signal with the level signal and detecting the small-amplitude edge around the large-amplitude edge of the image signal.

In this case, the small-amplitude edge, existing around the large-amplitude edge corresponding to the peak of the level signal, smaller than 1/n of the level of the large-amplitude edge can be detected by comparing the 1/n signal obtained by extending the peak of the level signal and compressing the same to 1/n times with the level signal, and this small-amplitude edge can be detected as mosquito noise and ringing.

The noise detection step may further include a step of comparing the extended signal with a prescribed reference level and detecting a large-amplitude edge having a greater level than the reference value, for detecting the small-amplitude edge as noise with respect to the large-amplitude edge.

In this case, the large-amplitude edge, which is a signal specific to the image signal having a greater level than the reference value, can be detected by comparing the extended signal obtained by extending the peak of the level signal corresponding to the large-amplitude edge with the prescribed reference value. Therefore, a small-amplitude edge around the large-amplitude edge specific to the image signal can be detected as noise, and mosquito noise and ringing can be more correctly detected.

A signal processing method according to a further aspect of the present invention comprises steps of detecting horizontal and/or vertical small-amplitude edge(s) around horizontal and/or vertical large-amplitude edge(s) of an input image signal as noise and performing horizontal and/or vertical correction of the image signal in response to the result of detection of the noise.

In the signal processing method, mosquito noise and ringing of the image signal are detected by detecting the horizontal and/or vertical small-amplitude edge(s) around the horizontal and/or vertical large-amplitude edge(s) of the image signal for performing horizontal and/or vertical correction of the input image signal in response to the result of detection. Therefore, the image signal can be properly corrected in response to the states of the mosquito noise and the ringing. Consequently, the image signal can be properly corrected without reducing the texture specific to the image signal also in a portion continuously exhibiting fine details.

The step of performing correction may include a step of performing horizontal and/or vertical smoothing of the image signal when noise is detected in the noise detection step.

In this case, the image signal is subjected to horizontal and/or vertical smoothing when noise, i.e., mosquito noise and ringing take place, whereby only the mosquito noise and the ringing can be smoothed for implementing an image having neither mosquito noise nor ringing.

The step of performing correction may include a step of performing horizontal and/or vertical contour correction of the image signal when no noise is detected in the noise detection step.

In this case, the image signal is subjected to horizontal and/or vertical contour correction when no noise, i.e., neither mosquito noise or ringing takes place, whereby a high-quality image having an enhanced edge portion specific to the image signal can be implemented without enhancing mosquito noise and ringing.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
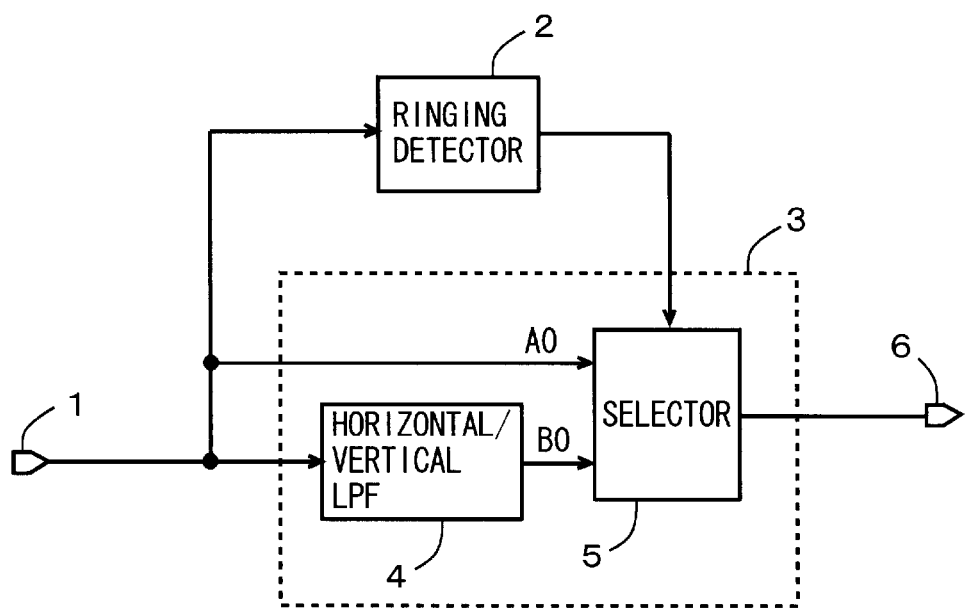
FIG. 1 is a block diagram showing the structure of a signal processor according to a first embodiment of the present invention.

A signal processor according to a first embodiment of the present invention is now described with reference to the drawings. FIG. 1 is a block diagram showing the structure of the signal processor according to the first embodiment of the present invention. In the following description, digital data corresponding to an image displayed on a screen is employed as an exemplary image signal, and it is assumed that terms "horizontal and vertical directions" indicate those of the screen respectively.

The signal processor shown in FIG. 1 comprises a ringing detector 2 and a signal smoother 3. The signal smoother 3 includes a horizontal/vertical low-pass filter (LPF) 4 and a selector 5.

The ringing detector 2 detects horizontal and vertical small-amplitude edges around horizontal and vertical large-amplitude edges of an image signal input through an image signal input terminal 1 as noise, and outputs the result of detection to the selector 5. The noise detected by the ringing detector 2, including ringing caused when transferring a digital image and mosquito noise caused when compression-coding the digital image, corresponds to ringing components caused around the large-amplitude edges.

The horizontal/vertical low-pass filter 4 performs smoothing for eliminating horizontal and vertical high-frequency components of the image signal input through the image signal input terminal 1, and outputs the smoothed image signal to an input terminal B0 of the selector 5. The image signal is input in another input terminal A0 of the selector 5 as such through the image signal input terminal 1. In response to the noise detection result output from the ringing detector 2, the selector 5 selects the image signal input through the input terminal A0 or the output signal of the horizontal/vertical low-pass filter 4 input through the input terminal B0 and outputs the selected signal to an image signal output terminal 6.

In the signal processor according to this embodiment, the ringing detector 2 corresponds to the detection circuit, and the signal smoother 3 corresponds to the processing circuit and the smoothing circuit.

Operations of the signal processor shown in FIG. 1 are now described. The image signal is input through the image signal input terminal 1, so that the ringing detector 2 detects portions causing mosquito noise and ringing around the large-amplitude edges of the image signal and outputs the result of detection to the selector 5.

When the ringing detector 2 detects that neither mosquito noise nor ringing takes place, the selector 5 outputs the image signal input in the input terminal A0 from the image signal input terminal 1 to the image signal output terminal 6 as such. In this case, therefore, the image signal is not smoothed but output as such.

When the ringing detector 2 detects that the image signal has a portion causing mosquito noise and ringing, on the other hand, the selector 5 outputs the signal input in the input terminal B0, i.e., the image signal smoothed by the horizontal/vertical low-pass filter 4 to the image signal output terminal 6.

Thus, only mosquito noise and ringing around the large-amplitude edges of the image signal can be smoothed due to the aforementioned operations, for implementing an image having neither mosquito noise nor ringing without reducing the texture of a portion continuously exhibiting fine details.

Figure 2:
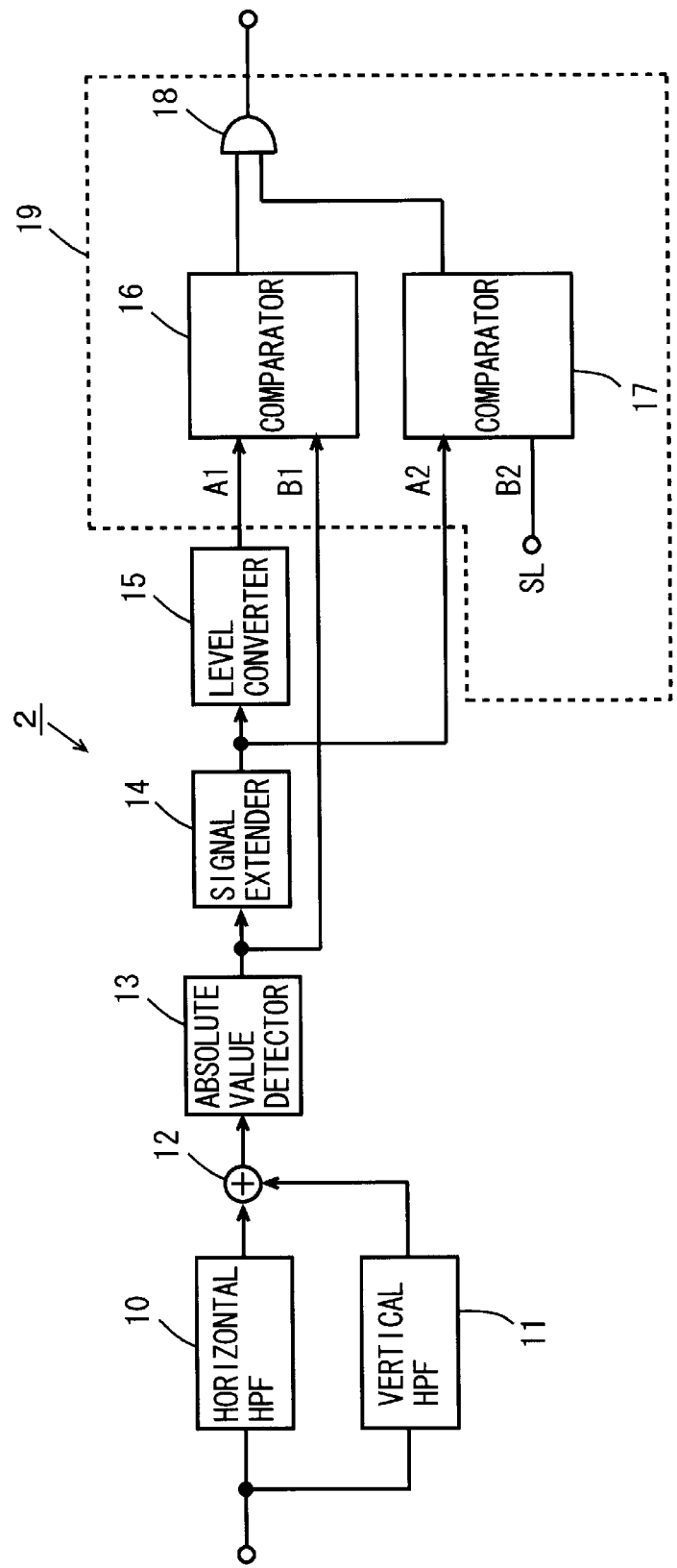
FIG. 2 is a block diagram showing the structure of a ringing detector shown in FIG. 1.

The ringing detector 2 shown in FIG. 1 is now described in more detail. FIG. 2 is a block diagram showing the structure of the ringing detector 2 shown in FIG. 1.

The ringing detector 2 shown in FIG. 2 includes a horizontal high-pass filter (HPF) 10, a vertical high-pass filter (HPF) 11, an adder 12, an absolute value detector 13, a signal extender 14, a level converter 15 and a ringing determination part 19. The ringing determination part 19 includes comparators 16 and 17 and an AND gate 18.

The horizontal and vertical high-pass filters 10 and 11 are connected with the image signal input terminal 1 shown in FIG. 1, for receiving the image signal respectively. The horizontal high-pass filter 10 extracts the horizontal high-frequency component of the input image signal and outputs the same to the adder 12. The vertical high-pass filter 11 extracts the vertical high-frequency component of the input image signal and outputs the same to the adder 12.

The adder 12 adds the horizontal high-frequency component extracted by the horizontal high-pass filter 10 and the vertical high-frequency component extracted by the vertical high-pass filter 11 to each other, and outputs the result to the absolute value detector 13.

The absolute value detector 13 obtains the absolute value of the sum of the high-frequency components, and outputs the result to the signal extender 14 as a level signal.

The signal extender 14 outputs an extended signal obtained by horizontally and vertically extending the peak of the level signal output from the absolute value detector 13 to the level converter 15.

The level converter 15 outputs a 1/n signal obtained by converting the level of the extended signal output from the signal extender 14 to 1/n times to an input terminal A1 of the comparator 16.

Noting that the levels of mosquito noise and ringing are smaller than those of the high-frequency components specific to the image signal, the value n is set for detecting small-amplitude edges having levels less than 1/n of the levels of the large-amplitude edges as mosquito noise and ringing. The value n, which can be set to an arbitrary value such as an integer or a real number, is preferably set to a value of at least 2 and not more than 8, more preferably at least 4 and not more than 8. The value n can be arbitrarily set from outside the signal processor, or may alternatively be previously stored in the signal processor if the value n is previously decided.

The comparator 16 compares the 1/n signal input in the input terminal A1 from the level converter 15 with the level signal input in another input terminal B1 from the absolute value detector 13 and outputs "1" (high in this embodiment) to the AND gate 18 when the 1/n signal is greater than the level signal while otherwise outputting "0" (low in this embodiment) to the AND gate 18.

The comparator 17 compares the extended signal input in an input terminal A2 from the signal extender 14 with a reference value SL input in another input terminal B2, for outputting "1" to the AND gate 18 when the extended signal is greater than the reference value SL, while otherwise outputting "0" to the AND gate 18.

The reference value SL is employed for detecting a signal specific to the image signal from the large-amplitude edges of the image signal. While an arbitrary value such as an integer or a real number can be employed as the reference value SL, a value of at least 64 is preferably employed when employing data of eight bits, i.e., 256 gradations as the maximum level of the image signal, for example. The reference value SL may be arbitrarily set from outside the signal processor, or may alternatively be previously stored in the signal processor when the value thereof is previously decided. The comparator 17 may alternatively compare the 1/n signal output from the level converter 15 with the reference value SL, which is also set to 1/n times in this case.

The AND gate 18 is connected to the selector 5 shown in FIG. 1, for outputting a signal of "1" to the selector 5 when both of the output signals from the comparators 16 and 17 are "1", while otherwise outputting a signal of "0" to the selector 5.

In the aforementioned ringing detector, the horizontal high-pass filter 10, the vertical high-pass filter 11 and the adder 12 correspond to the high-frequency component extraction circuit, the absolute value detector 13 corresponds to the level detection circuit, and the signal extender 14, the level converter 15 and the ringing determination part 19 correspond to the noise detection circuit. The signal extender 14 corresponds to the extension circuit, the level converter 15 corresponds to the conversion circuit, the comparator 16 corresponds to the small-amplitude detection circuit, the comparator 17 corresponds to the large-amplitude detection circuit, and the AND gate 18 corresponds to the logic circuit.

The horizontal high-pass filter 10 corresponds to the horizontal extraction circuit, the vertical high-pass filter 11 corresponds to the vertical extension circuit, and the adder 12 corresponds to the adder circuit.

Figure 3:
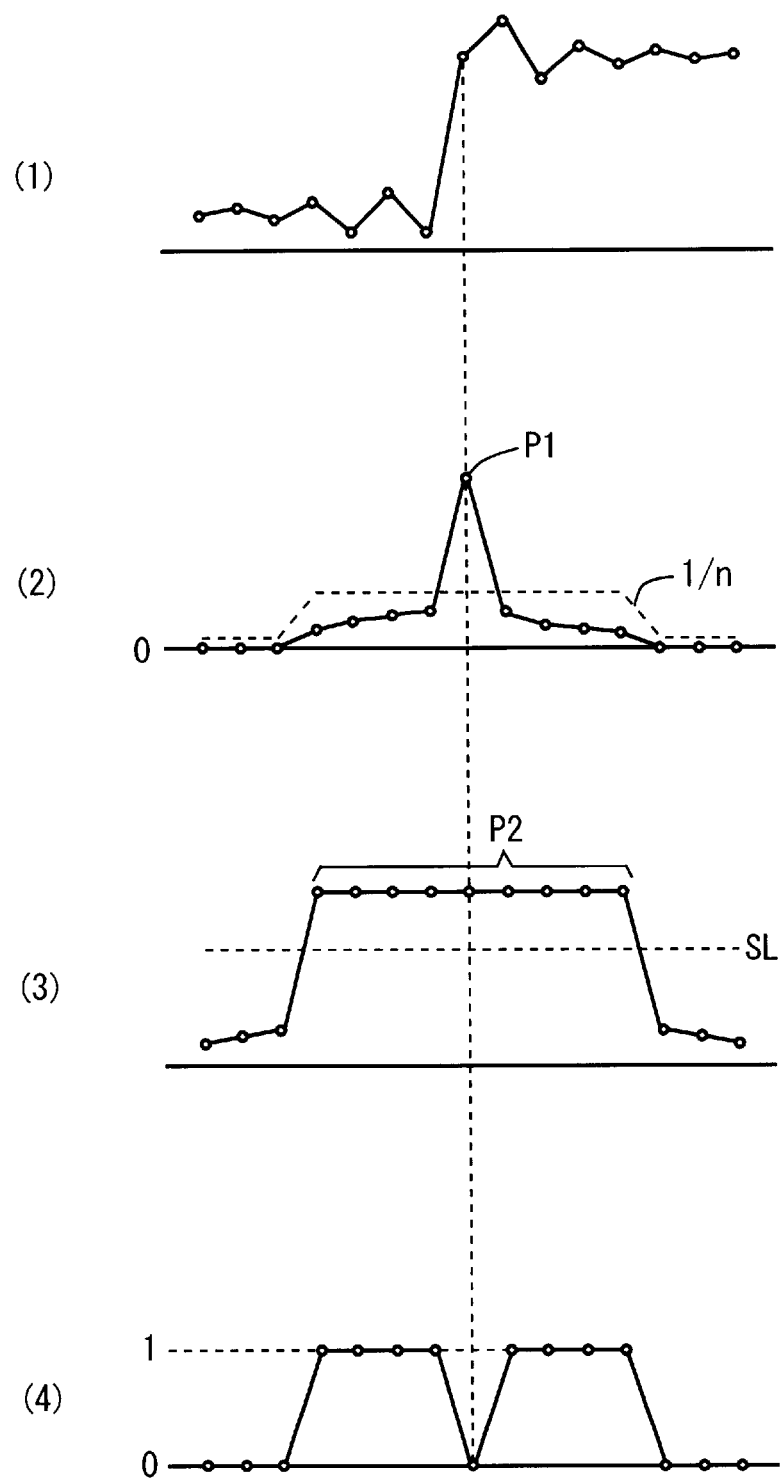
FIG. 3 is a waveform diagram for illustrating operations of the ringing detector shown in FIG. 2.

Operations of the ringing detector having the aforementioned structure are now described. FIG. 3 is a waveform diagram for illustrating the operations of the ringing detector shown in FIG. 2. Only horizontal processing of the ringing detector is hereafter described for simplifying the illustration. Vertical processing of the ringing detector is substantially similar to the horizontal processing described below except that delay processing is different due to different delay times for the processed signal and a memory corresponding thereto is employed, and hence redundant description is not repeated.

When an image signal shown at (1) in FIG. 3 is input, the horizontal and vertical high-pass filters 10 and 11 extract horizontal and vertical high-frequency components from the image signal respectively, and the adder 12 adds the extracted high-frequency components to each other.

Then, the absolute value detector 13 obtains the absolute value of the sum of the high-frequency components and outputs a level signal having a peak point P1 corresponding to a large-amplitude edge shown at (1) in FIG. 3, as shown by a solid line at (2) in FIG. 3.

Then, the signal extender 14 outputs an extended signal obtained by extending the peak point P1 of the level signal four pixels to the right and four pixels to the left, as shown by a solid line at (3) in FIG. 3. While the peak point P1 is extended four pixels to the right and four pixels to the left in this embodiment, the width of extension is not particularly restricted to this but properly decided in response to the noise to be detected.

Then, the level converter 15 outputs a 1/n signal obtained by converting the extended signal shown by the solid line at (3) in FIG. 3 to 1/n times, as shown by a broken line at (2) in FIG. 3. At this time, the comparator 16 compares the 1/n signal shown by the broken line at (2) in FIG. 3 with the level signal shown by the solid line, for outputting a result signal of "1" to the AND gate 18 when the 1/n signal is greater than the level signal, while otherwise outputting a result signal of "0" to the AND gate 18. In this case, the 1/n signal is greater than the level signal except the peak point P1, and hence the part other than the peak point P1 is output as "1" while the part of the peak point P1 is output as "0".

The comparator 17 compares the extended signal shown by the solid line at (3) in FIG. 3 with the reference value SL shown by a broken line, for outputting a result signal of "1" to the AND gate 18 when the extended signal is greater than the reference value SL, while otherwise outputting a result signal of "0" to the AND gate 18. In this case, the extended signal is greater than the reference value SL in a peak part P2 corresponding the central pixel, the four pixels on the right and the four pixels on the left, i.e., nine pixels in total, and hence the peak part P2 is output as "1" while the remaining part is output as "0".

Finally, the AND gate 18 ANDs the result signals output from the comparators 16 and 17, and outputs a signal shown at (4) in FIG. 3 to the selector 5 shown in FIG. 1. In this case, the part corresponding to the peak point P1 is output as "0", the parts corresponding to the four pixels on the right and the four pixels on the left are output as "1" and the remaining parts on both sides of these parts are output as "0".

As hereinabove described, the comparator 16 compares the level of the small-amplitude edge around the large-amplitude edge with the level of the large-amplitude edge converted to 1/n times and the comparator 17 compares the level of the large-amplitude edge with the reference value SL, thereby detecting the small-amplitude edge around the large-amplitude edge as noise only when the large-amplitude edge has a level greater than that of the reference value SL and the level of the small-amplitude edge around the same is less than the level of the large-amplitude edge converted to 1/n times. Consequently, only mosquito noise and ringing can be correctly detected independently of parts specific to the image signal.

The ringing detector 2 shown in FIG. 2, performing vertical processing similarly to the above, can detect vertical and horizontal small-amplitude edges around vertical and horizontal large-amplitude edges of the image signal as noise, for detecting horizontal and vertical mosquito noise and ringing around the horizontal and vertical large-amplitude edges of the image signal.

Figure 4:
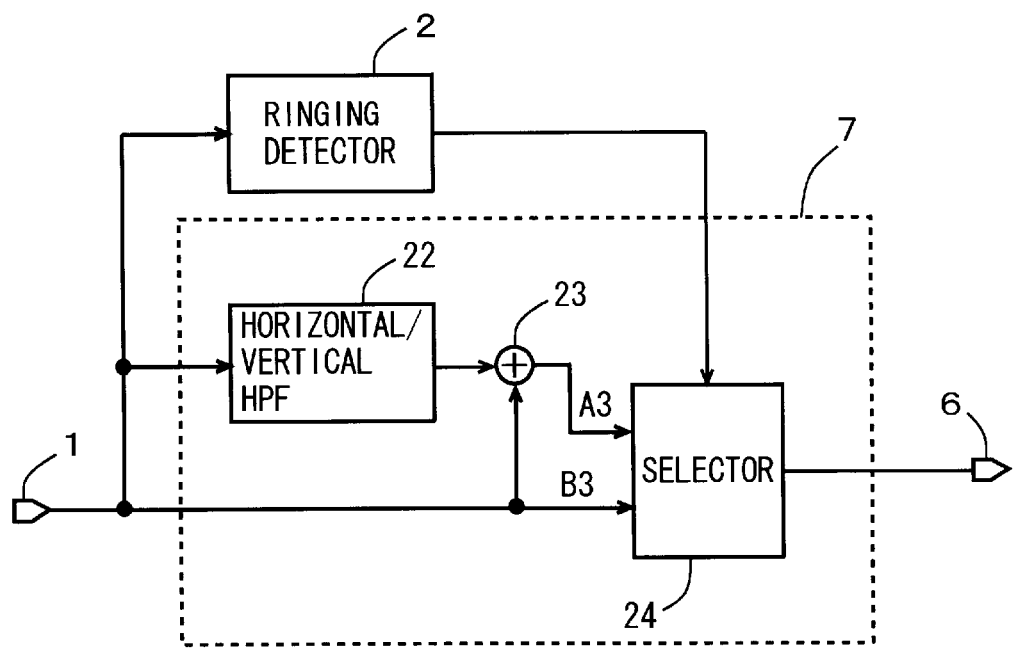
FIG. 4 is a block diagram showing the structure of a signal processor according to a second embodiment of the present invention.
Figure 5:
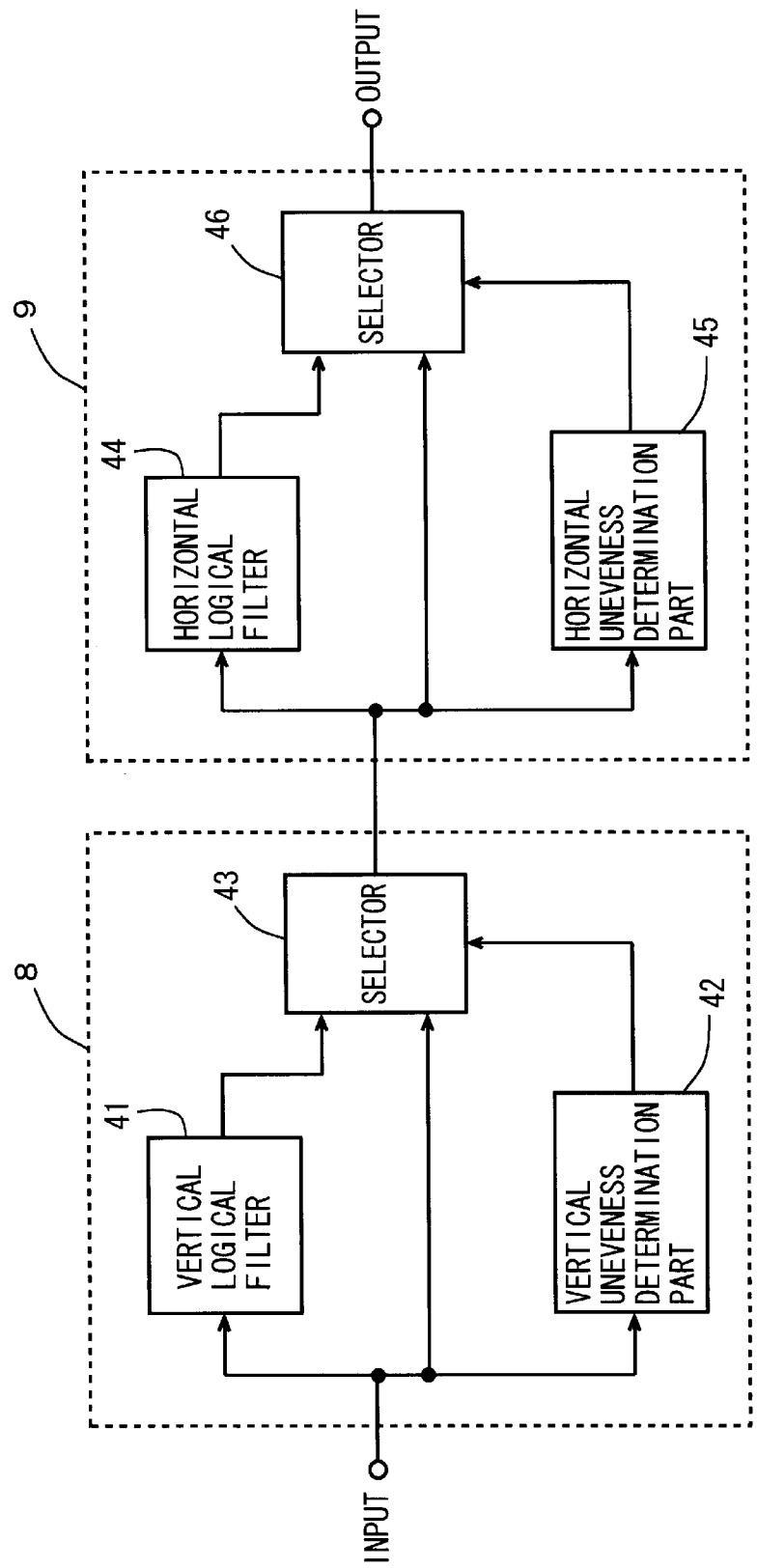
FIG. 5 is a block diagram showing the structure of a conventional signal processor.

A signal processor according to a second embodiment of the present invention is now described with reference to FIG. 4. FIG. 4 is a block diagram showing the structure of the signal processor according to the second embodiment of the present invention.

The signal processor shown in FIG. 4 comprises a ringing detector 2 and a contour corrector 7. The contour corrector 7 includes a horizontal/vertical high-pass filter (HPF) 22, an adder 23 and a selector 24. The ringing detector 2 shown in FIG. 4 is similar to that shown in FIG. 2, and hence redundant description is not repeated.

The horizontal/vertical high-pass filter 22 extracts horizontal and vertical high-frequency components from an image signal input through an image signal input terminal 1, and outputs the extracted high-frequency components to the adder 23. The adder 23 adds the horizontal and vertical high-frequency components output from the horizontal/vertical high-pass filter 22 and the image signal input through the image signal input terminal 1 to each other, and outputs a contour-corrected image signal to an input terminal A3 of the selector 24. Another input terminal B3 of the selector 24 receives the image signal as such through the image signal input terminal 1. The selector 24 selects either the contour-corrected image signal input from the input terminal A3 or the image signal input from the input terminal B3 in response to a noise detection result output from the ringing detector 2 and outputs the selected signal to an image signal output terminal 6.

In the signal processor according to this embodiment, the ringing detector 2 corresponds to the noise detection circuit, and the contour corrector 7 corresponds to the processing circuit and the contour correction circuit.

Operations of the signal processor shown in FIG. 4 are now described. First, the image signal is input through the image signal input terminal 1, and the ringing detector 2 detects portions causing mosquito noise and ringing around large-amplitude edges of the input image signal and outputs the result of detection to the selector 24.

When the ringing detector 2 detects portions causing neither mosquito noise nor ringing, the selector 24 outputs the signal input in the input terminal A3, i.e., the image signal subjected to contour correction by the horizontal/vertical high-pass filter 22 and the adder 23 to the image signal output terminal 6.

When the ringing detector 2 detects portions causing mosquito noise and ringing, the selector 24 outputs the image signal input from the image signal input terminal 1 in the input terminal B3 to the image signal output terminal 6 as such. In this case, therefore, no contour correction is performed but the image signal is output as such.

Only portions of the image signal causing neither mosquito noise nor ringing are subjected to contour correction while portions causing mosquito noise and ringing are not subjected to contour correction due to the aforementioned operations, whereby a high-quality image can be implemented by enhancing edge portions specific to the image signal without enhancing mosquito noise and ringing.

While the ringing detector detects portions causing mosquito noise and ringing for deciding whether or not to perform smoothing or contour correction on the detected portions in each of the aforementioned embodiments, the ringing detector 2 may alternatively detect the levels of the mosquito noise and the ringing for deciding whether or not to perform smoothing or contour correction in response to the levels of the mosquito noise and the ringing or changing the degree of the smoothing or the contour correction in response to the levels of the mosquito noise and the ringing.

While the image signal is horizontally and vertically processed in each of the aforementioned embodiments, the present invention is also applicable to the case of only horizontally or vertically processing the image signal.

While the ringing detector 2 and the signal processor are formed by hardware in each of the aforementioned embodiments, the processing of the aforementioned parts may alternatively be performed through software with a DSP (digital signal processor) or the like, to attain effects similar to the above.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A noise detector comprising:
    a high-frequency component extraction circuit extracting a high-frequency component of an input image signal;
    a level detection circuit detecting the level of said high-frequency component extracted by said high-frequency component extraction circuit and outputting the result of detection as a level signal; and
    a noise detection circuit detecting a small-amplitude edge around a large-amplitude edge of said image signal as noise on the basis of said level signal detected by said level detection circuit,
    wherein said noise detection circuit includes:
    an extension circuit outputting an extended signal obtained by extending the peak of said level signal detected by said level detection circuit,
    a conversion circuit outputting a 1/n signal obtained by converting the level of said extended signal output from said extension circuit to 1/n times, and
    a small-amplitude detection circuit comparing said 1/n signal output from said conversion circuit with said level signal output from said level detection circuit for detecting said small-amplitude edge around said large-amplitude edge of said image signal,
    wherein n is an integer.

2. The noise detector according to claim 1,
    wherein said noise detection circuit further includes:
    a large-amplitude detection circuit comparing said extended signal output from said extension circuit with a prescribed reference value for detecting a large-amplitude edge having a greater level than said reference value, for detecting said small-amplitude edge detected by said small-amplitude detection circuit as noise with respect to said large-amplitude edge detected by said large-amplitude detection circuit.

3. The noise detector according to claim 2, wherein
said small-amplitude detection circuit outputs a first detection result signal indicating that said 1/n signal output from said conversion circuit is greater than said level signal output from said level detection circuit,
said large-amplitude detection circuit outputs a second detection result signal indicating that said extended signal output from said extension circuit is greater than said reference value, and
said noise detection circuit further includes a logic circuit ANDing said first detection result signal output from said small-amplitude detection circuit and said second detection result signal output from said large-amplitude detection circuit.

4. A noise detector comprising:
a high-frequency component extraction circuit extracting a high-frequency component of an input image signal;
a level detection circuit detecting the level of said high-frequency component extracted by said high-frequency component extraction circuit and outputting the result of detection as a level signal; and
a noise detection circuit detecting a small-amplitude edge around a large-amplitude edge of said image signal as noise on the basis of said level signal detected by said level detection circuit,
wherein said high-frequency component extraction circuit includes:
a horizontal extraction circuit extracting a horizontal high-frequency component of said input image signal,
a vertical extraction circuit extracting a vertical high-frequency component of said input image signal, and
an adder circuit adding said horizontal high-frequency component extracted by said horizontal extraction circuit and said vertical high-frequency component extracted by said vertical extraction circuit to each other,
said level detection circuit detects the level of the sum of said high-frequency components obtained by said adder circuit and outputting the result of detection as said level signal, and
said noise detection circuit detects horizontal and vertical small-amplitude edges around horizontal and vertical large-amplitude edges of said image signal on the basis of said level signal detected by said level detection circuit.

5. A signal processor comprising:
a detection circuit detecting horizontal and/or vertical small-amplitude edge(s) around horizontal and/or vertical large-amplitude edge(s) of an input image signal as noise; and
a processing circuit performing horizontal and/or vertical correction of said image signal in response to the result of detection in said detection circuit;
said detection circuit includes;
a high-frequency component extraction circuit extracting a high-frequency component of said input image signal,
a level detection circuit detecting the level of said high-frequency component extracted by said high-frequency component extraction circuit and outputting the result of detection as a level signal, and
a noise detection circuit detecting said small-amplitude edge around said large-amplitude edge of said image signal on the basis of said level signal detected by said level detection circuit,
wherein said noise detection circuit includes:
an extension circuit outputting an extended signal obtained by extending the peak of said level signal detected by said level detection circuit,
a conversion circuit outputting a 1/n signal obtained by converting the level of said extended signal output from said extension circuit to 1/n times, and
a small-amplitude detection circuit comparing said 1/n signal output from said conversion circuit with said level signal output from said level detection circuit for detecting said small-amplitude edge around said large-amplitude edge of said image signal,
wherein n is an integer.

6. The signal processor according to claim 5, wherein
said processing circuit includes a smoothing circuit performing horizontal and/or vertical smoothing of said image signal in response to noise detected by said detection circuit.

7. The signal processor according to claim 6, wherein said smoothing circuit performs horizontal and/or vertical smoothing of said image signal when said detection circuit detects noise.

8. The signal processor according to claim 5, wherein
said processing circuit includes a contour correction circuit performing horizontal and/or vertical contour correction of said image signal in response to noise detected by said detection circuit.

9. The signal processor according to claim 8, wherein
said contour correction circuit performs horizontal and/or vertical contour correction of said image signal when said detection circuit detects no noise.

10. The signal processor according to claim 5, wherein
said noise detection circuit further includes:
a large-amplitude detection circuit comparing said extended signal output from said extension circuit with a prescribed reference value for detecting a large-amplitude edge having a greater level than said reference value,
for detecting said small-amplitude edge detected by said small-amplitude detection circuit as noise with respect to said large-amplitude edge detected by said large-amplitude detection circuit.

11. The signal processor according to claim 10, wherein
said small-amplitude detection circuit outputs a first detection result signal indicating that said 1/n signal output from said conversion circuit is greater than said level signal output from said level detection circuit,
said large-amplitude detection circuit outputs a second detection result signal indicating that said extended signal output from said extension circuit is greater than said reference value, and
said noise detection circuit further includes a logic circuit ANDing said first detection result signal output from said small-amplitude detection circuit and said second detection result signal output from said large-amplitude detection circuit.

12. A signal processor comprising:
a detection circuit detecting horizontal and/or vertical small-amplitude edge(s) around horizontal and/or vertical large-amplitude edge(s) of an input image signal as noise; and a processing circuit performing horizontal and/or vertical correction of said image signal in response to the result of detection in said detection circuit;

said detection circuit includes;

a high-frequency component extraction circuit extracting a high-frequency component of said input image signal, a level detection circuit detecting the level of said high-frequency component extracted by said high-frequency component extraction circuit and outputting the result of detection as a level signal, and a noise detection circuit detecting said small-amplitude edge around said large-amplitude edge of said image signal on the basis of said level signal detected by said level detection circuit, wherein said high-frequency component extraction circuit includes:

a horizontal extraction circuit extracting a horizontal high-frequency component of said input image signal, a vertical extraction circuit extracting a vertical high-frequency component of said input image signal, and an adder circuit adding said horizontal high-frequency component extracted by said horizontal extraction circuit and said vertical high-frequency component extracted by said vertical extraction circuit to each other, said level detection circuit detects the level of the sum of said high-frequency components obtained by said adder circuit and outputting the result of detection as said level signal, and said noise detection circuit detects horizontal and vertical small-amplitude edges around horizontal and vertical large-amplitude edges of said image signal on the basis of said level signal detected by said level detection circuit.

13. A noise detection method comprising steps of:

extracting a high-frequency component of an input image signal;

detecting the level of said extracted high-frequency component and outputting the result of detection as a level signal; and detecting a small-amplitude edge around a large-amplitude edge of said image signal as noise on the basis of said level signal, wherein said noise detection step includes steps of:

outputting an extended signal obtained by extending the peak of said level signal, outputting a 1/n signal obtained by converting the level of said extended signal to 1/n times, and comparing said 1/n signal with said level signal and detecting said small-amplitude edge around said large-amplitude edge of said image signal, wherein n is an integer.

14. The noise detection method according to claim 13, wherein said noise detection step further includes a step of comparing said extended signal with a prescribed reference level and detecting a large-amplitude edge having a greater level than said reference value, for detecting said small-amplitude edge as noise with respect to said large-amplitude edge.

* * * * *